United States Patent [19]
Stoffels et al.

[11] 3,861,252
[45] Jan. 21, 1975

[54] AIR CHUCK FOR ROLL SLITTING MACHINE

[75] Inventors: Carl A. Stoffels, Flemington; Roger J. Lofstrom, Randolf Township, both of N.J.

[73] Assignee: Judelshon Industries, Inc., Jersey City, N.J.

[22] Filed: Mar. 4, 1974

[21] Appl. No.: 448,056

[52] U.S. Cl................ 82/40 R, 82/101, 279/4
[51] Int. Cl.................................. B23b 31/00
[58] Field of Search........... 82/40, 101, 46, 89, 43, 82/44; 279/4

[56] References Cited
UNITED STATES PATENTS
1,509,997  9/1924  Fry............................................. 279/4
3,323,399  6/1967  Gerstein et al. ....................... 82/101
3,427,909  2/1969  Schaap................................... 82/101
3,522,748  8/1970  Treffner................................. 82/101

Primary Examiner—Leonidas Vlachos
Attorney, Agent, or Firm—Amster & Rothstein

[57] ABSTRACT

An improved air chuck for use in a roll slitting machine of the type used to slit wide rolls of material into narrow width rolls or ribbons. The air chuck includes gripping jaws which are actuated by air pressure to grip and rotate the core of a roll of material. The chuck provides a rotating mandrel for the core at the point it is engaged by the jaws and it also provides coaxial internal bearing means for a stationary mandrel adapted to extend coaxially through the core on the roll of material in order to support the roll as it is rotated.

4 Claims, 4 Drawing Figures

PATENTED JAN 21 1975　　　　　　　　　　　　　　　3,861,252
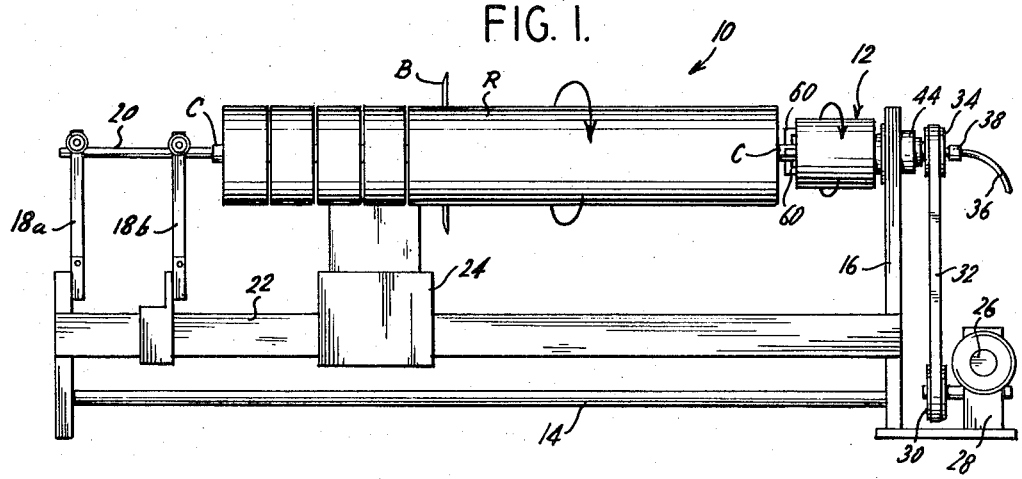
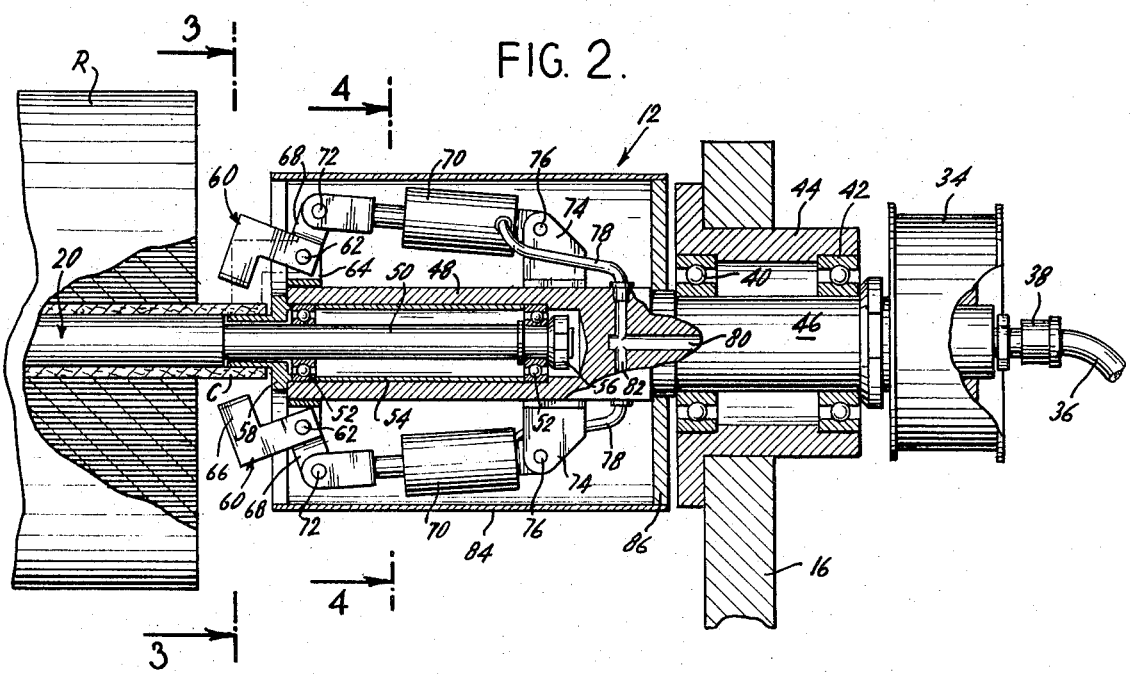
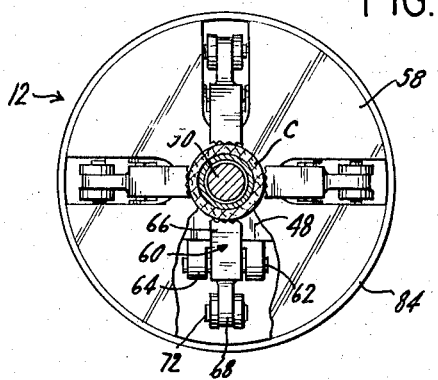
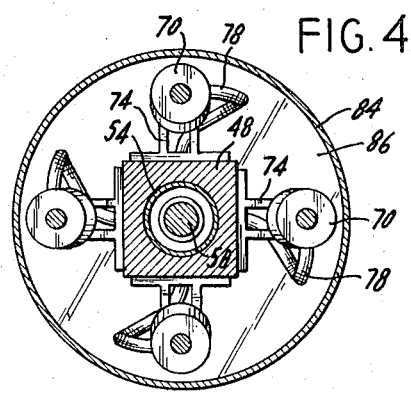

AIR CHUCK FOR ROLL SLITTING MACHINE

The present invention relates generally to machinery for use in the fabric and film industries in which wide widths of rolled-up material are slit into ribbons or narrower rolls. Such machines are commonly referred to as single knife cutters and they generally comprise means to rotate a roll of material about its own axis while simultaneously advancing a rotating circular knife blade radially into the roll. The knife is moved through the material on the roll and then through the core which is typically cardboard.

Among the problems which have existed in machines of this type is the difficulty and inconvenience of gripping the roll of material in order to rotate it about its own axis. Typically, this chucking operation has been performed by mechanical chucks which engage the periphery of the roll or the core in a typical clamping operation. While such chucks have been used for many years, they have demonstrated significant failings in that they are relatively difficult to use, they take more time than is necessary to engage them and they have been known, on too many occasions, to damage the material and/or the ends of the cores.

In general, it is an object of the present invention to provide an air chuck for a single knife slitting machine which improves the performance which was available in the prior art and obviates one or more of the above-stated disadvantages.

Specifically, it is an object of the present invention to provide an air chuck which quickly and efficiently, upon the simple application of appropriate pneumatic pressure, will provide a firm and secure clamp on the core of a roll of material such that upon rotation of the chuck, the core and therefore the roll of material will be rotated about its own axis.

In accordance with one illustrative example of the present invention, there is provided an improved air chuck in a single knife slitting machine. The slitting machine comprises a stationary mandrel which is mounted at one end on conventional mounting mechanisms and on the other end in an improved rotating air chuck. The air chuck is driven by conventional drive means to rotate same about its own axis so that it can be used to rotate a roll of material fitted coaxially about the stationary mandrel. A carriage is mounted for movement parallel to the mandrel to different cutting locations along the length of a roll of material. A power-driven circular knife blade is mounted on the carriage for movement perpendicular to the axis of the mandrel to make periodic slicing cuts into the roll of material. The air chuck includes means to mount it for rotation within the frame of the machine and as provided with rotational coupling means to connect an air pressure supply to the chuck. It also is provided with drive means to drive the chuck through rotational motion. In addition to its bearing means which mounts the chuck itself within the frame of the machine, the chuck also contains bearing means to receive and support the end of the stationary mandrel while the chuck rotates about its own axis. Mounted coaxially about the central axis, and in position to engage a core mounted on the mandrel, are a plurality of movable chuck jaws which move between a gripping position in which they may engage the end of the core of a roll of material and a release position in which the core may be easily removed. Air passages are provided to direct air from the rotating coupling to appropriate piston and cylinder assemblies which energize the gripping jaws to move between their release and their gripping positions. Upon energization of the drive means to drive the rotating chuck, and upon closing the chuck jaws, the air chuck will quickly and efficiently engage the end of a core of material and will rotate same. An extending internal collar which rotates with the air chuck may project therefrom coaxially about the mandrel and may be used as a backing member inside the end of the core to provide an internal support below the chuck jaws so that the core walls are pinched between the jaws and the internal collar.

The above brief description, as well as further objects or features and advantages of the present invention, will be best understood by reference to the following detailed description of one presently preferred embodiment, when taken in conjunction with the accompanying drawings wherein:

FIG. 1 is a front elevational view of a single knife cutting machine incorporating an air chuck in accordance with the present invention;

FIG. 2 is a sectional view of an illustrative embodiment of the air chuck in accordance with the present invention showing its interconnection with the frame of a machine, a stationary mandrel and a roll of material and its core;

FIG. 3 is a sectional view taken along the lines 3—3 of FIG. 2 looking in the direction of the arrows; and FIG. 4 is a sectional view taken along the line 4—4 of FIG. 2 looking in the direction of the arrow.

Now referring to FIG. 1, there is shown a roll slitting machine generally designated by the numeral 10 which includes an improved air chuck 12 in accordance with the present invention. The machine 10 generally comprises a frame 14 having a chuck mounting arm 16 at one end and, at the other end, a stationary mandrel support arm 18a and a movable mandrel support arm 18b. The movable support arm 18b is mounted along a track 22 which runs a length of the machine and is intended to provide a support for the mandrel as close as possible to the end of the roll of material R and its internal core C. At times, rolls of different widths will be cut on the machine. Also mounted on the track 22 is a carriage 24 on which is mounted a blade B and appropriate means to rotate the blade and move it radially into the roll R. A motor 26 is provided which drives a gear reduction unit 28, the output of which is connected to a pulley 30 which drives belt 32, which then drives a second pulley 34 which is connected to the air chuck 12 as will be described in greater detail below. An air line 36 is also connected to the air chuck 12 through a rotatable coupling 38 and its function will be described in greater detail below.

The air chuck 12 in accordance with the present invention provides two functions, the first being to engage the core C of the roll R to drive it through its rotational movement about its own axis and the second being to provide support for the end of the stationary mandrel 20. The following description will first be directed to the support functions for the mandrel 20 and thereafter a description will be given of the chucking and driving mechanism.

The chuck 12 is mounted on the fixed arm 16 of the frame 14 in a pair of ball bearings 40, 42 which are positioned within a mounting collar 44 which is pressed into the support arm 16. The main central body 46 of the chuck 12 is mounted in the bearings 40, 42 and it is through this main rotating body 46 that the chuck 12 is supported on the frame 14; the weight of the roll R and the mandrel 20 is thus carried to the frame 12 through the central body 46 and the bearings 40, 42. The main body 46 extends inwardly of the machine to a hollow portion 48 which is adapted to receive a reduced diameter portion 50 of the mandrel 20 on its inner surface and to support the jaws of the chuck on its outer surface. A pair of ball bearings 52 are mounted within the hollow portion 48 of the body 46 with an appropriate spacer sleeve 54 therebetween. The reduced diameter portion 50 of the mandrel 20 is positioned within the inner race of the ball bearings 52 and is kept in place by a cap 56 at its end. An end collar 58 is positioned coaxially in the end of the hollow portion 48 of the chuck body 46 such that it rotates with the chuck 12. The end of the collar 58 extends outwardly from the chuck 12 and rotates about the reduced diameter portion 50 of the mandrel. The inner diameter of the end collar 58 is larger than the diameter of the reduced portion 50 of the mandrel and the outside diameter of the end collar is sized to be compatible with the inner diameter of the core C. The purpose of the extending portion of the end collar, as will be described in greater detail below, is to provide an internal clamping support for the core C when it is gripped by the jaws of the air chuck 12.

A pulley 34 is fixed to the main body 46 of the air chuck 12 on the outward side of the ball bearings 42. As may be best seen in FIG. 1, the main body of the air chuck is driven for rotation by the motor 26 through the belt 32 and the pulley 34.

Four chuck jaws 60 or gripping members are pivotally mounted on the external surfaces of the main body 46 of the air chuck 12. Specifically, each of the chuck jaws 60 generally take the shape of a bell crank lever and are pivotally mounted at pivots 62 at 90° intervals around the hollow portion 48 of the main chuck body 46. The pivots 62 are engaged in mounting brackets 64 which are rigidly secured to the member 48. As shown in FIG. 4, the body 48 is of a square external cross-section, however, any shape can be employed. Each of the chuck jaws 60 extend from pivot 62 in one direction forming an L-shaped gripping head 66 and extend at a right angle in an actuating extension 68. Each gripping head 66 is formed with appropriate grooves extending in an axial direction relative to the machine such that it can provide good frictional contact with the core C as will be described below. The jaws 60 are movable from an open position as shown in full line in FIG. 2 to a closed position as shown in phantom lines in FIG. 2. The movement between the opened and the clamping positions of the jaws 60 are provided by a series of four piston and cylinder assemblies 70 which are interconnected with the clamping jaws at the actuating pivot 72 and which are mounted on mounting brackets 74 at pivots 76. As will be seen and readily appreciated by inspecting FIGS. 2 through 4, upon the extension of the piston and cylinder assemblies 70, the mounting jaws 60 will be pivoted around their respective pivots 62 bringing the gripping heads 66 radially inwardly from their opened to their clamping positions.

Pneumatic force for operation of the jaws 60 is provided through the pneumatic tubes 78 which are connected between the piston and cylinder assembly 70 and appropriate ports formed in the body 46 of the air chuck 12. Specifically, extending from the rotating coupling connection 38 for the external air line 36, and through the axis of the main body 46, is a central air line 80 which, at the beginning of the mandrel support portion 48, interconnects with transverse air passageways 82 leading to each of the four air tubes 78.

Upon the application of pressure through the air line 36, the ports 80 and 82, the air tubes 78 and the piston and cylinder assemblies 70, the serrated faces of the gripping member 60 are moved tightly into engagement with the core C of a roll of material R. The end of the core C is tightly engaged between the gripping member 60 and the internal collar or clamping 58 which extends into the end of the core as is best shown in FIG. 2. The entire assembly is covered with a cylindrical housing 84 which is supported at its outer end by the circumference of the front plate and collar 58, and at its rearward end by a rear end plate 86.

The air chuck 12 may be more completely understood by considering the following description of its operation. A roll of material R and associated core are threaded over the mandrel 20 with the core extending slightly beyond the full diameter portion of the mandrel 20 and around the internal support of the collar 58. The end supports 18a and 18b for the mandrel 20 are then fixed in position. The air chuck 12 is energized by passing air through the air line 36, the ports 80 and 82, and the air tubes 78, to the piston and cylinders 70. This causes the gripping jaws 60 to pivot about their pivotal mounts 62 bringing the gripping heads 66 into tight engagement on the outside diameter of the extending end of the core C. The core C is thus clamped between the gripping jaws 60 and the rotating collar or clamping support 58. Upon energization of the motor 26, the air chuck 12 is driven through the conventional belt and pulley system and the roll of material R is rotated about the stationary mandrel 20. The mandrel remains fixed in position against rotation since it is clamped at its free end and the chuck 12 rotates relative to the mandrel and supports the mandrel by the ball bearings 52 within the hollow portion 48 of the chuck body. The roll of material R is cut into segments as is generally shown in FIG. 1, working from the outer end of the roll toward the air chuck. Upon completion of the cutting operations, the air supply is reduced and the clamping pressure on the clamping jaws 60 is released thereby enabling the removal of the core from the mandrel 20.

The machine described above and illustrated in the drawings is only one example of the use of the concepts of the present invention. Variations in the specifics of this machine, both major and minor, can be made without departing from the scope of the invention.

What we claim is:

1. In a machine for slitting a roll of material wound onto a core and into cylindrical form as said roll is rotated about a stationary mandrel; the improvement comprising an improved fluid actuated chuck for gripping the core of a roll of material, said chuck comprising a chuck body mounted in the frame of said machine coaxially with the machine mandrel including bearing means for the free rotation thereof, bearing means within said rotating chuck body attached to receive one end of the machine mandrel and to support same in a stationary non-rotating manner, chuck jaw means movably mounted on said rotating chuck body and movable from a gripping position in which said jaws are engaged with the core of a roll of material to be slit and a release position disengaged from the core, fluid powered actuation means operatively connected to said chuck jaw means to move same from the release position to the gripping position, fluid pressure means including rotatable fluid coupling means providing a connection between said rotating portion of said chuck and a source of fluid pressure and means providing a fluid passage way from said rotatable coupling member to said fluid powered actuation for moving said jaw means from the release position to the gripping position, drive means connected to said rotating chuck body of said chuck for rotating a roll of material on the machine mandrel by rotating said chuck body and said chuck jaw means when the same are engaged with the core of a roll of material mounted on the mandrel.

2. The device in accordance with claim 1 wherein said rotating portion includes a hollow member extending axially outwardly from said bearing means which mount said rotating member coaxially with the stationary mandrel, the end of the mandrel being received into said hollow member and being supported thereby.

3. The device in accordance with claim 2 wherein rotating bearing means are provided between the end of said stationary mandrel and the inside of said hollow member to rotatably support said mandrel as said chuck rotates about it.

4. The device in accordance with claim 3 wherein said chuck includes a cylindrical collar mounted on said rotating chuck body of a diameter compatible with the internal diameter of the core and located radially inwardly of said chuck jaw means, said chuck jaw means when in said gripping position engaging the exterior of a core of a roll of material between said jaw means with said cylindrical collar providing a clamping support on the interior of said core.

* * * * *